E. H. SHERBONDY.
DUPLEX TURBO COMPRESSOR.
APPLICATION FILED MAY 14, 1918.
1,310,682.
Patented July 22, 1919.
3 SHEETS—SHEET 1.
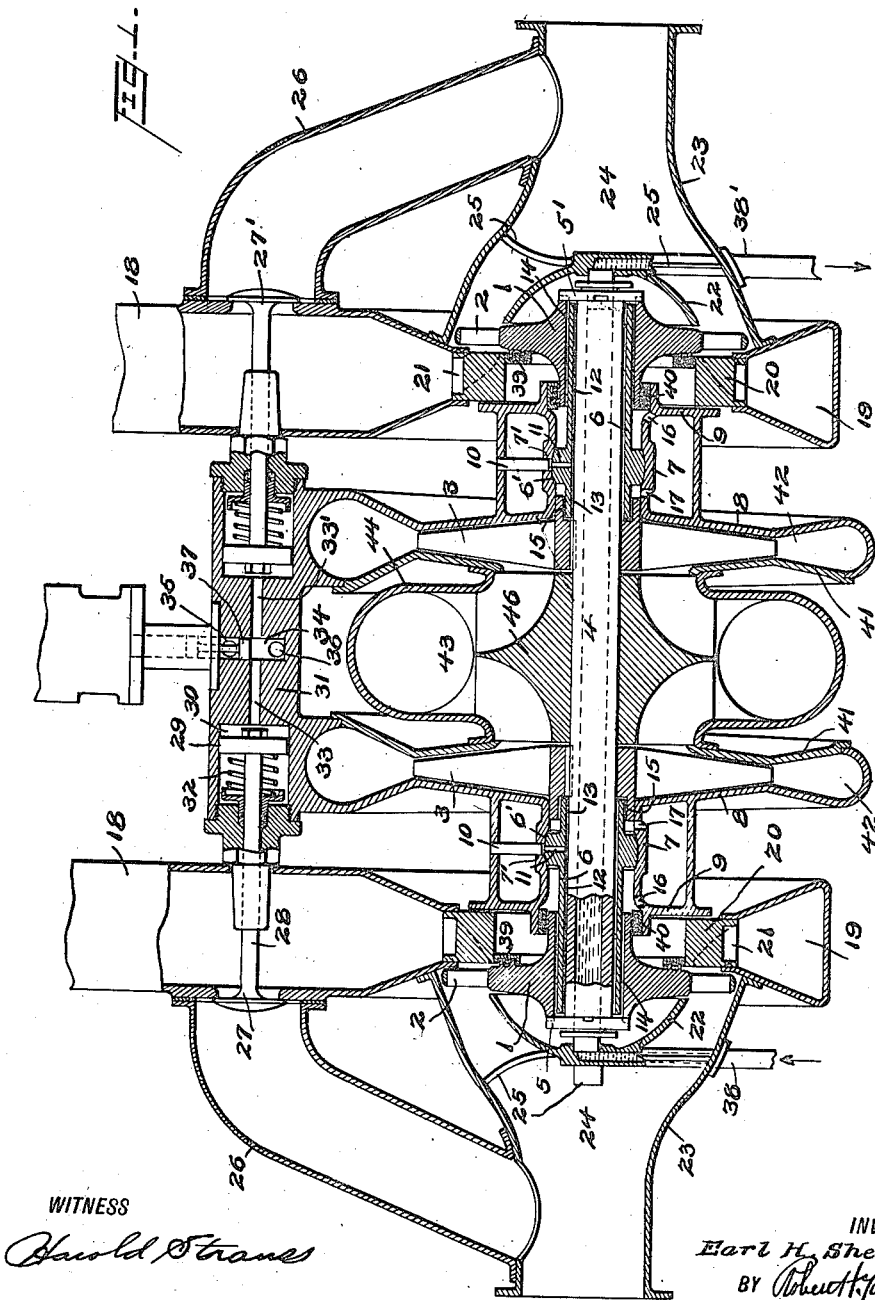
WITNESS
Harold Strauss
INVENTOR
Earl H. Sherbondy
BY
ATTORNEY

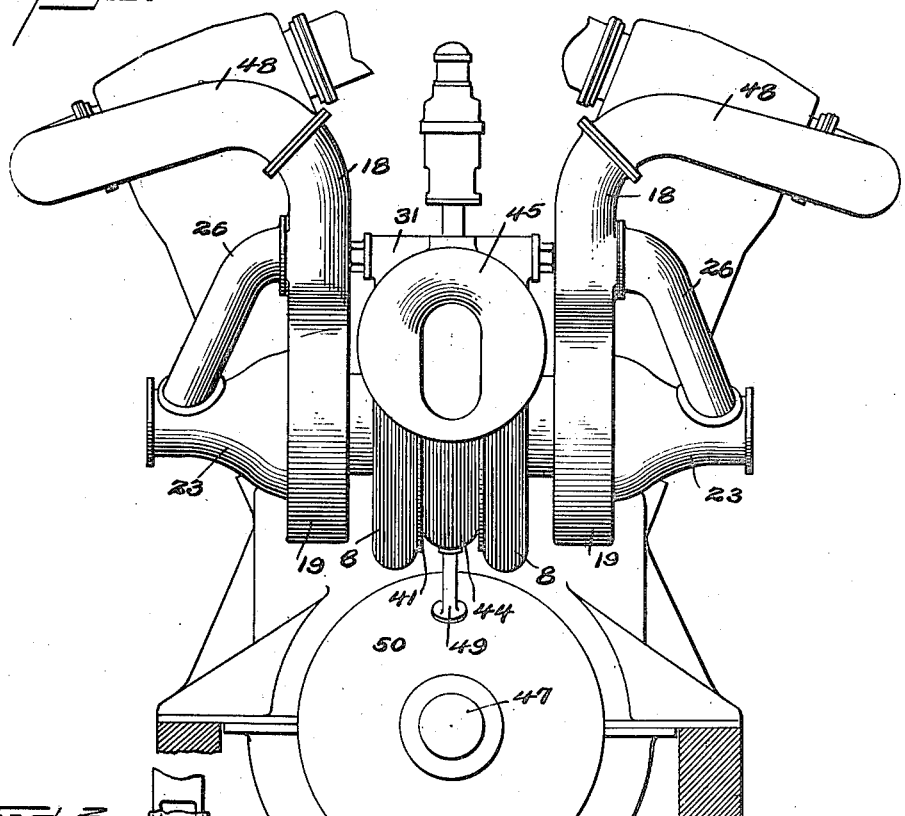
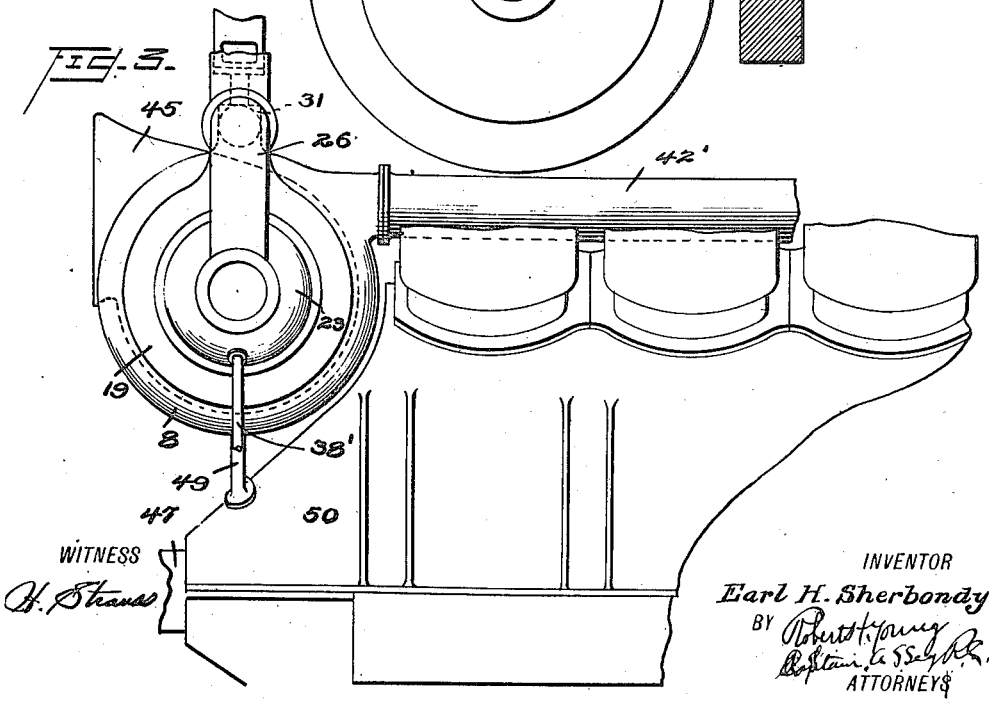

E. H. SHERBONDY.
DUPLEX TURBO COMPRESSOR.
APPLICATION FILED MAY 14, 1918.
1,310,682.
Patented July 22, 1919.
3 SHEETS—SHEET 3.
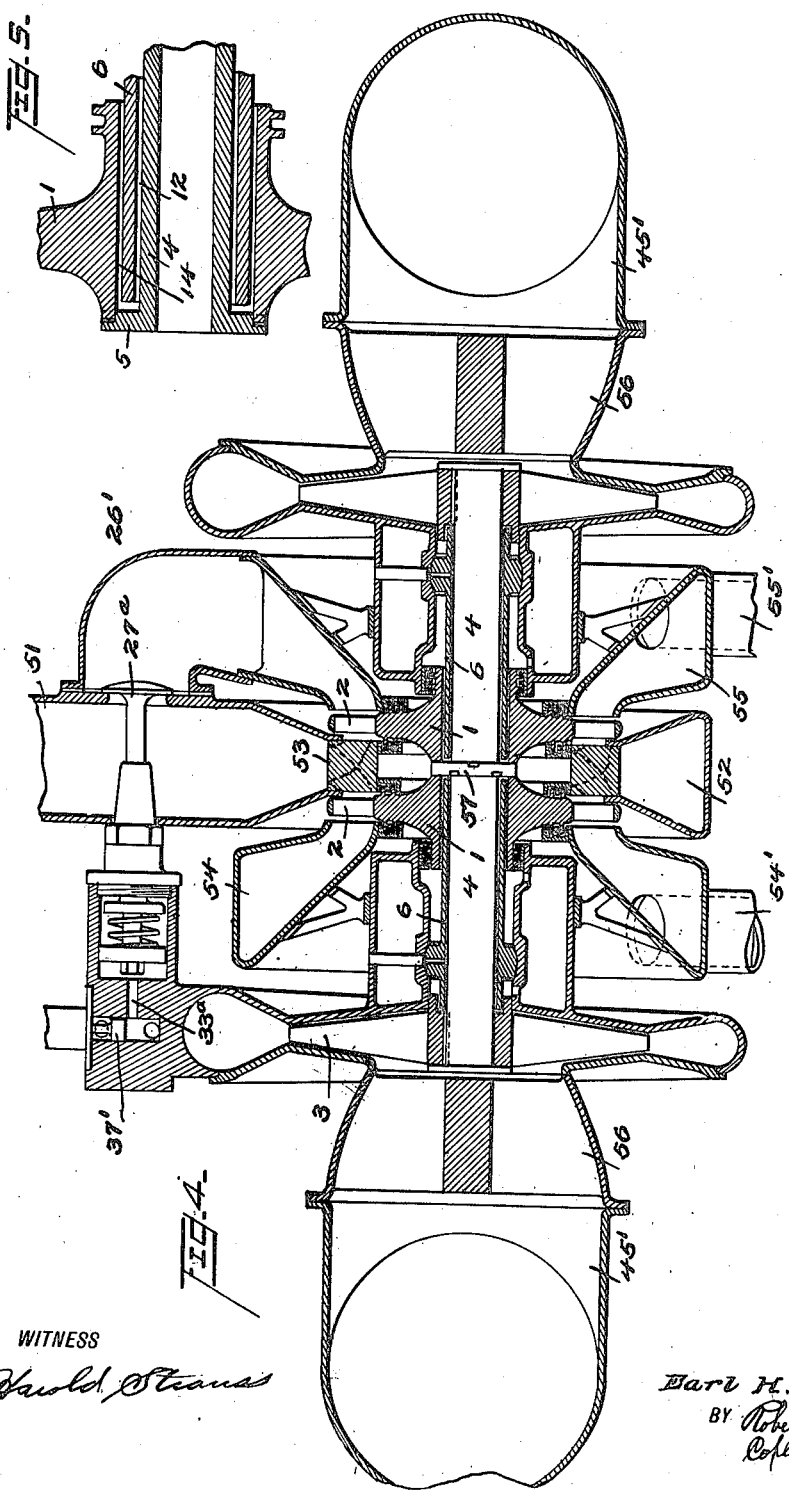
WITNESS
Harold Strauss
INVENTOR
Earl H. Sherbondy
BY
ATTORNEY

UNITED STATES PATENT OFFICE.

EARL H. SHERBONDY, OF CLEVELAND, OHIO.

DUPLEX TURBO-COMPRESSOR.

1,310,682. Specification of Letters Patent. Patented July 22, 1919.

Application filed May 14, 1918. Serial No. 234,555.

*To all whom it may concern:*

Be it known that I, EARL H. SHERBONDY, a citizen of the United States, residing at Cleveland, in the county of Cuyahoga and State of Ohio, have invented certain new and useful Improvements in Duplex Turbo-Compressors, of which the following is a specification.

This invention relates to a duplex turbo-compressor, that is to say, one comprising two turbo-compressor units, each unit in turn comprising the usual turbine wheel and usual compressor wheel mounted on the same shaft therewith.

Each turbo-compressor is adapted to be operated by the waste gases from an internal combustion engine, more particularly an airplane engine, and are intended to supply air under pressure to the carbureters of the engine, at substantially constant pressure, regardless of the height at which the airplane may be.

The power of an airplane engine rapidly falls off at higher altitudes, due to the fact that the air is thinner at such altitudes, and while the suction stroke of the engine takes in the same volume of air as it does at sea level, the oxygen content of this volume of air is less than at sea level, in proportion approximately to the height at which the airplane may be.

The principal object of this invention is to provide a duplicate turbo-compressor set, consisting of two small turbo-compressor units, all mounted on the same shaft, instead of a single such unit, as shown in my co-pending case, Serial No. 224,356, filed March 23, 1918.

By making the rotating element of the turbo-compressors small, much higher speeds can be obtained, which will result in a very appreciable reduction in weight for the same amount of air delivered from the compressors.

The single turbo-compressor, comprising one turbine and one compressor, as shown in my said co-pending case, is intended to be run at from 20,000 to 30,000 R. P. M. By making the rotating elements smaller and doubling their number, they may be run up to 50,000 R. P. M., this higher speed resulting in maintaining a sufficient air supply and a reduction in the total weight of the structure.

It is a further object of the invention to provide means for automatically controlling the pressure in the air deliveries from the compressors, so that it is substantially constant.

It is a further object of the invention to mount all the rotating elements of the two turbo-compressor units on the same shaft, or on a shaft which, while it may be made in two parts, the two parts are clutched together to form substantially a one-piece shaft.

It is a further object of the invention to position either the two compressor units, or the two turbine units adjacent one another, so that, in the case of the compressor units a common air intake, and, if desired, a common air delivery may be provided, and in the case of the turbine units a common gas intake and a common nozzle ring may be provided.

Other objects and advantages will appear as the description proceeds.

In the drawings, illustrating my invention, Figure 1 is a sectional view showing the two turbo-compressor units; Fig. 2 is a front view of an airplane engine, showing the duplex turbo-compressor positioned thereon; Fig. 3 is a side view of the same; Fig. 4 is a modification, showing the turbo-compressor elements reversely postioned from the arrangement shown in Fig. 1; and Fig. 5 is a view on an enlarged scale of a bearing detail.

The duplex turbo-compressor comprises two turbo-compressor units, each in turn consisting of a turbine wheel 1, provided with the usual buckets 2 and a compressor wheel 3, the two wheels being mounted on a common shaft 4. The turbines 1 are shown positioned at opposite ends of the shaft 4, and the two compressor wheels are shown mounted adjacent one another near the middle of said shaft. The turbines 1 are clutched to the shaft 4 by the clutch elements 5 and 5' to rotate with the shaft. Annular bearing collars 6 surround the shaft 4 toward each end, and extend within the hub of each turbine wheel 1. This bearing 6 is provided with the usual curved seat 6', which is positioned in a suitable housing 7, which may be in turn supported from the casing elements 8 and 9, associated with the compressor wheel 3 and turbine wheel 1, respectively.

The bearing collar 6 surrounds the shaft 4 with a small clearance, and is positioned within the hub of the wheel 1 with a small clearance. These clearance spaces are intended to be filled with oil under suitable pressure, to provide a bearing for the wheel 1. The oil is led to the clearance spaces through a pipe 10, which may be supplied with oil from the forced feed lubricating system from the engine. The pipe 10 leads oil through a suitable aperture 7' in the housing, to the oil duct 11 in the curved seat 6', the oil then passing to the right and left clearance spaces 12 and 13, respectively, forming a film of oil around the shaft 4 and between it and the collar 6. The oil after filling the spaces 12 and 13 passes around the ends of the collar to fill the spaces 14 and 15 on the other side of the collar 6, thereby forming another oil film to serve as a bearing, the oil film in the oil space 14 serving as a bearing for the wheel 1, and the oil film in the space 15 serving as a bearing for the wheel 3. The oil escapes after being circulated through the described clearances through holes 16 and 17. The particular type of bearing just described is duplicated on the other end of the duplex turbo-compressor, as shown in Fig. 1.

The exhaust gases that operate the two turbine wheels are led thereto through the exhaust pipes 18 which open into annular chambers 19. Suitably positioned within each of the chambers 19 is a nozzle 20, which guides gas through suitable nozzle passages 21 onto the buckets 2 of the turbine. This nozzle ring 20 is made the subject of co-pending application Serial No. 234,553, filed May 14, 1918.

Suitably positioned on the exhaust side of the turbine 1 are annular casing elements 22 and 23, which define between them an exhaust passage 24 for the escape of the gases. The annular elements 22 and 23 may pass just outside the fuselage, and may be flanged for the attachment of a suitable exhaust pipe. The element 23 may be supported, as shown in Fig. 1, by attachment to the chamber 19. The annular elements 22 may be supported from the element 23 by four or more radial arms 25. Associated with the exhaust inlet pipe 18 and with the exhaust outlet chamber 24, there is a by-pass pipe 26 opening into pipe 18 and chamber 24, respectively. The opening between the pipe 18 and the pipe 26 is controlled by valve 27, which when open, will by-pass the gases around the turbine, and thereby allow it to slow down. Correspondingly closure of this valve 27 will cause all the exhaust gas to pass through the turbine, and will speed it up.

The valve 27 with the usual valve stem 28, is controlled by piston 29, moving in a cylinder 30, which may be formed in a suitable housing member 31. A spring 32 is positioned on one side of the piston 29, to tend to hold the valve 27 closed. The other side of the piston is in communication with an oil pressure passage 33. It will be evident, that variations in the oil pressure within this passage 33 will cause operation of the valve 27. Oil passage 33 communicates with oil passage 34, the oil entering the passage 34 through the pressure passage 35, and escaping therefrom through the drain 36. The balanced valve 37 controls the flow of oil from the pressure passage 35 to the passages 33, and it is evident that movements of this valve will vary the oil pressure that influences the pistons 29 to by-pass more or less of the gases, to cause the turbo-compressor to slow down or speed up. This valve 37 may be controlled by any suitable pressure responsive element, such as shown in my co-pending case, Serial No. 224894, filed March 26, 1918.

The valve 37 in addition to controlling the passage 33, controls the oil pressure within the passage 33', which in turn operates piston mechanism for a valve 27', similar in all respects to that just described for the valve 27. Provided the valve control mechanisms are identical, it will be evident that substantially the same amount of gas will be led to each of the two turbines 1, and that they will therefore be subject to substantially the same driving force. Being on the same shaft, they of course always turn at the same speed.

The passages for the exhaust gas 18, 19, etc., are duplicated on the other end of the duplex turbo-compressor for the other turbo-compressor unit.

The shaft 4 is made hollow for the circulation therethrough of a suitable cooling medium such as water, the water being led in at one end through the pipe 38, which may be a part of one of the supporting arms 45 for the element 22. The water, after passing through the length of the shaft, escapes through a pipe 38' similar to the pipe 38.

The labyrinth packings 39 and 40 are located, as shown, between the nozzle ring 20 and the turbine wheel 1, and between the turbine wheel 1 and casing element 9, respectively. The packing 39 serves to prevent the exhaust gases escaping inwardly toward the shaft, and the packing 40 serves to confine the oil so that it will drain out of its proper passage 16.

The two compressor wheels 3 are provided with casing elements 8 and 41, which are associated to refine the usual air delivery pipe 42.

The air inlets for the two wheels 3 open toward each other into the air intake passage 43. A suitably curved air guide 44 defines this passage 43, the guide 44 merging into the air intake horn 45. The annular element 46 serves to divide the incoming air, and to feed it to the right and left to the two wheels. The operation of the common air intake will, it is evident, supply substantially the same quantity of air to each compressor wheel 3, and this will result in each wheel delivering substantially the same quantity of air at substantially the same pressure, inasmuch as they run at the same speed.

Referring now to Figs. 2 and 3, the duplex turbo-compressor is shown positioned on an airplane engine of the Liberty type. The shaft 4 of the duplex turbo-compressor is positioned transversely across the front of the engine at right angles to the main crank shaft 47 thereof, and slightly above said shaft, as shown in Fig. 3. The exhaust manifolds 48 of the engine are connected to the exhaust inlets 18. One or more studs 49 may be provided to suitably mount the apparatus on the crank case 50 of the engine. The air horn 45 faces in the direction of travel of the airplane, so that the ingress of the air will be facilitated, due to the rush of the airplane through the air. The horn 45 may be further located in the propeller blast, whereby the ingress of the air will be still further augmented.

The two air delivery pipes 42 may be connected to suitable air lines 42', located between the V shaped cylinders, the said pipes 42' leading the compressed air to the carburetors.

Referring now to Fig. 4, the same essential parts are shown, with the difference, however, that instead of the two driven elements, the compressor wheels 3 being located adjacent one another, in this case the two driving elements, that is to say the turbine wheels 1 are located adjacent one another. This difference results in there being provided a common intake for the exhaust gases. These exhaust gases enter through the common exhaust pipe 51, which leads the gases into an exhaust chamber 52, which in turn leads the gases to a double nozzle ring 53, positioned between the two turbines 1. This double nozzle ring 53 is provided with a double set of nozzles, one set delivering gas to the right to one of the turbines, and the other set delivering gas to the left to the other turbine. This nozzle ring is made the subject of a separate application Serial No. 234,553, filed May 14, 1918.

The exhaust gas, after leaving the turbine buckets, passes into the exhaust chambers 54 and 55, respectively, from whence it is led to the exterior of the fuselage, through exhaust pipes 54' and 55', respectively.

In place of the common air intake 45 shown in Fig. 3, there are provided two air intake horns 45', one for each of the wheels 3. These horns 45' lead air to the air intake mouths 56 associated with each of the two compressor wheels 3.

Associated with the exhaust inlet pipe 51 and exhaust chamber 55 there is a by-pass pipe 26'. The opening between the pipes 51 and 26' is controlled by the valve 27$^a$, similar in principle and operation to the valve 27, and which is controlled by a valve 37' that operates to vary the oil pressure in oil passage 33$^a$ in the same way that valve 37 varies the oil pressure in passage 33 to operate valve 27.

In this modification the two wheels 1 are clutched to each other and to the shaft 4 by a clutch element 57.

Bearing collars 6, similar in mounting and operation to the collar 6 described in connection with Fig. 1, are provided surrounding the shaft 4 and positioned within the hubs of the wheels 1 to provide clearance spaces intended to be filled with films of oil, as described in connection with Fig. 1.

Labyrinth packings may be provided, as shown, for the same purposes as shown in Fig. 1.

The particular point to note in connection with the modification 4, is that there is a common inlet for the gases that operate the turbine, and that one valve controls the by-passing of gas, and that one nozzle ring serves to deliver gas to both of the turbines. The two turbine wheels as well as the two compressor wheels 3, being clutched to the shaft 4, rotate at the same speed.

In both showings the making of the rotating units in two small parts, rather than in one larger rotating unit, will enable the whole apparatus to be run at much higher speeds. It is a comparatively simple matter to build a small turbine of from 3 to 4 inches in extreme diameter, that will run safely as high as 50,000 R. P. M., while it is difficult to build larger rotating units to travel at such speeds without unduly increasing the weight. The net result, therefore, is that by doubling the number of rotating parts, and making them considerably smaller, and running them at higher speeds, there is attained more power output for a given weight of the apparatus.

While I have shown certain embodiments of my invention, and certain mountings of my invention on an airplane engine, it should be understood that both the device itself and the manner of mounting may be varied within the scope of the invention.

I claim—

1. In combination with an internal combustion engine, two coaxial turbo-compressor units, and means to lead the exhaust gas from the engine to the turbines of the turbo-compressor units.

2. In combination with an internal combustion engine, two turbines, two air compressors, said turbines and said compressors being coaxially mounted, and means to lead exhaust gas from said engine to said turbines.

3. In combination with an internal combustion engine, two coaxially mounted turbo-compressor units, each unit comprising two rotating elements, one rotating element of one set being located adjacent the rotating element of the same character of the other set, and means to lead exhaust gas from said engine to said turbines.

4. In combination with an internal combustion engine, two coaxially mounted turbo-compressor units, each unit comprising two rotating elements, one rotating element of one set being located adjacent the rotating element of the same character of the other set, a common fluid conduit associated with said adjacently positioned rotating elements, and means to lead exhaust gas from the engine to the other two rotating elements.

5. In combination with an internal combustion engine, two coaxial turbo-compressor units, means to lead exhaust gas from the engine to the turbines of the said units and means to control the amount of exhaust gas delivered to the turbines.

6. In combination with an internal combustion engine, two coaxial turbo-compressor units, means to lead exhaust gas from the engine to the turbines of the said units and means for causing the exhaust gas to pass through the turbines, or to by-pass around the turbines.

7. In combination with an internal combustion engine, two coaxial turbo-compressor units, means to lead exhaust gas from the engine to the turbines of the said units and pressure responsive means to control the amount of exhaust gas delivered to the turbines.

8. In combination with a multi-cylinder internal combustion engine of the V type, two coaxial turbo-compressor units, means to lead exhaust gas from one set of cylinders to one turbine of one turbo-compressor unit and means to lead exhaust gas from the other set of cylinders to the other turbine of the other turbo-compressor unit.

9. In combination with a multi-cylinder internal combustion engine of the V type, two coaxial turbo-compressor units, means to lead exhaust gas from one set of cylinders to one turbine of one turbo-compressor unit and means to lead exhaust gas from the other set of cylinders to the other turbine of the other turbo-compressor unit, and means to control the quantity of gas delivered to the turbines.

10. In combination with a multi-cylinder internal combustion engine of the V type, two coaxial turbo-compressor units, means to lead exhaust gas from one set of cylinders to one turbine of one turbo-compressor unit and means to lead exhaust gas from the other set of cylinders to the other turbine of the other turbo-compressor unit, and pressure responsive means to control the quantity of gas delivered to the turbines.

11. In combination with an internal combustion engine, two turbo-compressor units, a common shaft therefor, means to lead exhaust gas from the engine to the turbines of the turbo-compressor units and means to cool said shaft.

12. In combination with an internal combustion engine, two turbo-compressor units, a common hollow shaft therefor, means to lead exhaust gas from the engine to the turbines of the turbo-compressor units and means to cause a cooling medium to circulate through said hollow shaft.

13. In combination with an internal combustion engine, two turbo-compressor units, means to lead the exhaust gas from the engine to the turbines of the turbo-compressor units and a common air intake associated with the two compressor units.

14. In combination with an internal combustion engine, two coaxial turbo-compressor units, means to lead the exhaust gas from the engine to the turbines of the turbo-compressor units and a common air intake associated with the two compressor units.

In testimony whereof I affix my signature.

EARL H. SHERBONDY.